Nov. 1, 1955     D. H. FRYKLUND     2,722,614
VIBRATION AND SHOCK-RESPONSIVE DEVICE
Filed Aug. 11, 1951
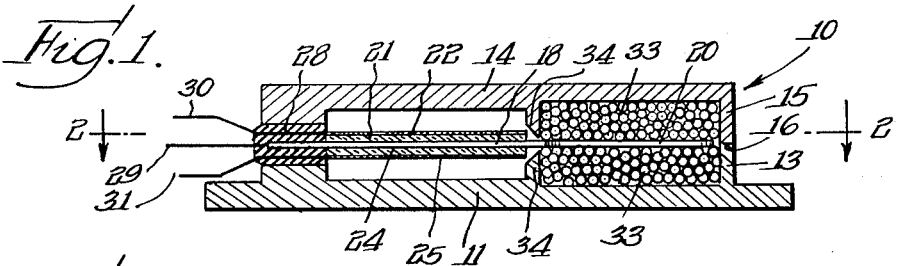
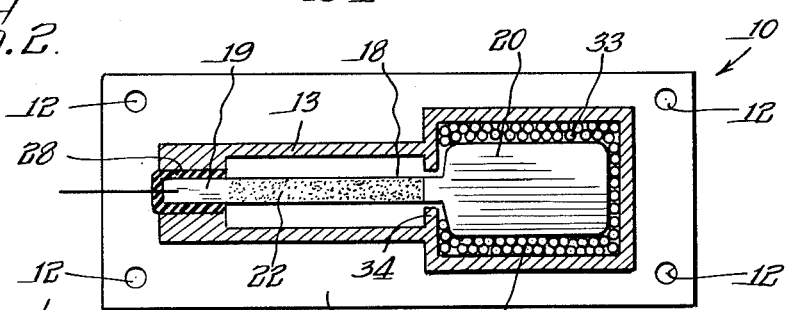
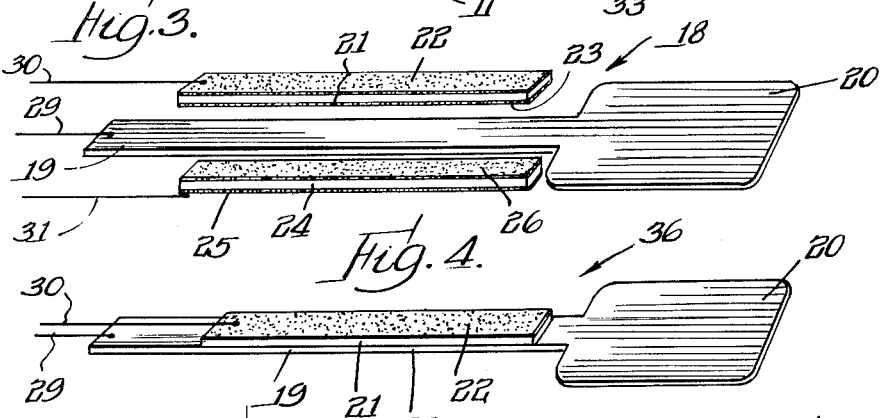
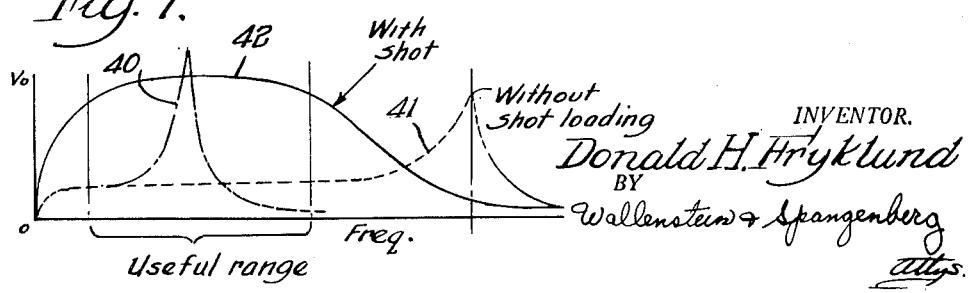
INVENTOR.
Donald H. Fryklund
BY
Wallenstein & Spangenberg
attys.

United States Patent Office 2,722,614
Patented Nov. 1, 1955

2,722,614

VIBRATION AND SHOCK-RESPONSIVE DEVICE

Donald H. Fryklund, Metuchen, N. J., assignor to Gulton Mfg. Co., a corporation of New Jersey Application August 11, 1951, Serial No. 241,473

7 Claims. (Cl. 310—8.6)

This invention relates to a vibration and shock-responsive device and is an improvement over the accelerometer disclosed in application Serial No. 165,462, filed by Glenn N. Howatt and Abraham I. Dranetz on June 1, 1950.

In the accelerometer of the aforementioned application a resilient bender element including a piezoelectric element is mounted on a body in such a manner that as the body vibrates the resilient bender element vibrates to produce a voltage in accordance with such vibration. The distributed mass and compliance of the bender element thereof is such as to make the same very sensitive or resonant over a narrow range of frequency. At the resonant frequency the output voltage is high compared to the output voltage at other frequencies. Since it is often desirable to have a constant output voltage for a given acceleration or vibration strength over a wide band of frequencies, it is now common in such accelerometers to design the bender element so that the voltage peak occurs at a frequency two or three times the highest frequency that is to be encountered in the use of the accelerometer. This results in decreased voltage output and sensitivity.

The principal object of this invention is to provide an improved vibration and shock-responsive device, such as an accelerometer or the like, wherein a very broad peaking results in the frequency response of the device, and wherein maximum sensitivity and substantially constant output voltage are obtained over a wide band of frequencies.

The vibration and shock-responsive device of this invention includes a hollow housing adapted to be subjected to vibration and shock and a bender element rigidly mounted at one end in the housing perpendicular to the direction of vibration and shock. The bender element includes a piezoelectric element for producing a voltage in accordance with the flexing of the bender element. Fine shot is confined in the housing about the free end of the bender element for flexing the bender element in accordance with the vibration and shock applied to the housing. This fine shot causes broad peaking in the frequency response of the device. The mass and compliance of the bender element is so designed that this broad peaking lies in the desired range of frequencies of the vibration and shock to which the device is to be subjected. The voltage output of the device of this invention and, hence, its sensitivity are as great throughout a wide range of frequencies as those of the prior construction which are operated at its narrow peak frequency range and considerably greater than those of the prior construction which are not operated at peak frequency.

The bender element of the device of this invention preferably has its free end widened into a paddle so that a relatively large amount of fine shot is operative upon the paddle portion for flexing the bender element. The piezoelectric element is preferably in the form of a titanate ceramic sheet secured to the resilient element of the bender and the titanate ceramic element is polarized to make the same piezoelectric. As the resilient element is flexed by the fine shot the polarized titanate ceramic element is correspondingly flexed to produce the output voltage. A single titanate ceramic element or a pair of titanate ceramic elements secured to opposite faces of the resilient element may be utilized in forming the bender element.

Further objects of this invention reside in the details of construction of the vibration and shock-responsive device and in the cooperative relationships between the component parts thereof.

Other objects and advantages of this invention will become apparent to those skilled in the art upon reference to the accompanying specification, claims and drawing in which:

Fig. 1 is a vertical sectional view through one form of the vibration and shock responsive device of this invention;

Fig. 2 is a horizontal sectional view taken substantially along the line 2—2 of Fig. 1;

Fig. 3 is an exploded perspective view of the bender element utilized in Figs. 1 and 2;

Fig. 4 is a perspective view of another form of the bender element;

Fig. 5 is a voltage-frequency curve illustrating the operation of the accelerometer of the aforementioned application Ser. No. 165,462;

Fig. 6 is a voltage-frequency curve illustrating the operation of the accelerometer of the aforementioned application wherein the voltage peak occurs at a frequency two or three times that occurring in the useful range; and Fig. 7 is a voltage-frequency curve illustrating the manner of operation of the vibration and shock-responsive device of this invention and comparing the same with the accelerometer of the aforementioned application.

Referring now to Figs. 1 to 3, the one form of the vibration and shock-responsive device of this invention is generally designated at 10. It includes a hollow housing having a base portion 11 provided with mounting holes 12 for securing the same to an object whose vibration or shock is to be measured by the device. The base portion 11 includes upstanding side walls 13. The hollow housing also includes a cover portion 14 having depending side walls 15 which engage the upstanding side walls 13 of the base portion at 16, the cover portion being suitably secured to the base portion. Thus, the base portion 11 and the cover portion 14 form a hollow housing.

Located within the hollow housing is a bender element generally designated at 18 and shown more particularly in Fig. 3. This bender element 18 includes a resilient element 19 made of spring metal such as Phosphor bronze or the like. The outer or free end of this resilient element 19 is widened to form a paddle portion 20. A pair of piezoelectric elements 21 and 24 are secured to the resilient element 19 and preferably these piezoelectric elements 21 and 24 are formed of thin sheets of titanate ceramic, such as substantially pure barium titanate ceramic. The titanate ceramic element 21 has electrodes 22 and 23 secured to opposite faces thereof and, likewise, the titanate ceramic element 24 has electrodes 25 and 26 secured to opposite faces thereof. The electrodes 22, 23, 25 and 26 may be formed on the ceramic elements 21 and 24 by applying suitable silver paste to the opposite faces thereof and then firing the paste to form a good bond between the electrodes and the ceramic elements. The ceramic elements 21 and 24 are secured to the resilient element 19 in any suitable manner, as by soldering the electrodes 23 and 26 to the resilient element 19.

One end of the resilient element 19 of the bender element 18 is rigidly mounted in the hollow housing, as by clamping the same in an electrical insulating pad 28 between the base portion 11 and the cover portion 14 of the hollow housing. An electrical lead 29 connects to the resilient element 19 and electrical leads 30 and 31 connect to the electrodes 22 and 25, these leads extending through the insulating pad 28 so as to be electrically insulated from each other. The titanate ceramic elements 23 and 24 are permanently polarized to make the same piezoelectric. In this connection, the leads 30 and 31 are connected to one terminal of a D. C. voltage source and the lead 29 is connected to the other terminal thereof and a sufficiently high voltage is applied to the leads for a sufficiently long time so as permanently to polarize the titanate ceramic elements 21 and 24. Thus, as the bender element 18 is flexed, a voltage is produced across the leads 30, 31 in accordance with the direction, extent and frequency of flexing of the bender element.

Fine shot 33 is located within the hollow housing about the free end, that is the paddle portion end 20, of the bender element 18 for flexing the bender element. This fine shot 33 is maintained about the free end of the bender element by suitable partitions 34 within the hollow housing. While the shot substantially completely fills the housing, it is not packed therein so that it is movable and forms a compliant movable mass.

In use, the vibration and shock-responsive device of this invention is secured to an object whose vibration and shock is to be measured and when the device is secured to the object the bender element 18 is located perpendicular to the direction of vibration and shock. Thus, as the object vibrates the bender element is vibrated by the fine shot 33 acting on the free end of the bender element.

The bender element 36 of Fig. 4 is the same as the bender element 18 of Figs. 1 to 3 with the exception that only a single piezoelectric element is utilized and like reference characters for like parts have been used. Here the voltage produced by flexing of the bender element appears across the terminals 29 and 30. The operation of the vibration and shock-responsive device utilizing the bender element 36 is substantially the same as that utilizing the bender element 18.

The curve 40 of Fig. 5 illustrates the voltage-frequency characteristics of the accelerometer disclosed in the aforementioned application Ser. No. 165,462 wherein the distributed mass and compliance of the bender element is such as to make the same very sensitive or resonant over a very narrow range of frequency. At the resonant frequency $f_0$ the output voltage is high compared to the output voltage at other frequencies. Since it is often desirable to have a constant output voltage for a given acceleration or vibration strength over a wide band of frequencies, it is common to design the bender element so that the voltage peak occurs at a frequency two or three times the highest frequency that is to be encountered in the use of the accelerometer. This arrangement is illustrated in Fig. 6 wherein the resonant frequency $f_0$ is located considerably beyond the useful range of the accelerometer, the voltage-frequency curve being designated at 41. This arrangement, however, results in decreased voltage output and sensitivity over the useful range.

Fig. 7 illustrates at 42 the voltage-frequency curve of the vibration and shock-responsive device of this invention. The fine shot 33 causes broad peaking in the frequency response of the device over the useful range. In this respect, the mass and compliance of the bender element is so designed that this broad peaking lies in the desired range of frequencies of the vibration and shock to which the device is subjected. By comparing the curves 40, 41 and 42 it is seen that the voltage output and, hence, the sensitivity of the vibration and shock-responsive device of this invention are relatively high and substantially constant over the useful range, they being substantially as great as the peaked voltage and sensitivity of Fig. 5 and considerably greater than the voltage and sensitivity over the useful range of Fig. 6.

While for purposes of illustration two forms of this invention have been disclosed, other forms thereof may become apparent to those skilled in the art upon reference to this disclosure and, therefore, this invention is to be limited only by the scope of the appended claims.

I claim as my invention:

1. A vibration and shock-responsive device comprising a hollow housing adapted to be subjected to vibration and shock, a bender element rigidly mounted at one end in the housing perpendicular to the direction of vibration and shock and including a piezoelectric element for producing a voltage in accordance with the flexing of the bender element, and fine shot movably contained in the housing about the free end of the bender element for flexing the bender element in accordance with the vibration and shock applied to the housing.

2. A vibration and shock-responsive device comprising a hollow housing adapted to be subjected to vibration and shock, a bender element rigidly mounted at one end in the housing perpendicular to the direction of vibration and shock and including a titanate ceramic element which has been polarized to make the same piezoelectric for producing a voltage in accordance with the flexing of the bender element, and fine shot movably contained in the housing about the free end of the bender element for flexing the bender element in accordance with the vibration and shock applied to the housing.

3. A vibration and shock-responsive device comprising a hollow housing adapted to be subjected to vibration and shock, a resilient element rigidly mounted at one end in the housing perpendicular to the direction of vibration and shock, fine shot movably contained in the housing about the free end of the resilient element for flexing the resilient element in accordance with the vibration and shock applied to the housing, and a piezoelectric element secured to the resilient element intermediate its ends for producing a voltage in accordance with the flexing of the resilient element.

4. A vibration and shock-responsive device comprising a hollow housing adapted to be subjected to vibration and shock, a resilient element rigidly mounted at one end in the housing perpendicular to the direction of vibration and shock, fine shot movably contained in the housing about the free end of the resilient element for flexing the resilient element in accordance with the vibration and shock applied to the housing, and a titanate ceramic element polarized to make the same piezoelectric secured to the resilient element intermediate its ends for producing a voltage in accordance with the flexing of the resilient element.

5. A vibration and shock-responsive device comprising a hollow housing adapted to be subjected to vibration and shock, a resilient element rigidly mounted at one end in the housing perpendicular to the direction of vibration and shock, fine shot in the housing about the free end of the resilient element for flexing the resilient element in accordance with the vibration and shock applied to the housing, and a pair of titanate ceramic elements secured to opposite sides of the resilient element intermediate its ends and polarized to make the same piezoelectric for producing a voltage in accordance with the flexing of the resilient element.

6. A vibration and shock-responsive device comprising a hollow housing adapted to be subjected to vibration and shock, a bender element rigidly mounted at one end in the housing perpendicular to the direction of vibration and shock and including a piezoelectric element for producing a voltage in accordance with the flexing of the bender element, the free end of the bender element being widen to form a paddle, and fine shot movably contained in the housing about the paddle portion of the bender element for flexing the bender element in accordance with the vibration and shock applied to the housing.

7. A vibration and shock-responsive device comprising a hollow housing adapted to be subjected to vibration and shock, a resilient element rigidly mounted at one end in the housing perpendicular to the direction of vibration and shock and having its free end widened to form a paddle, fine shot movably contained in the housing about the paddle portion of the resilient element for flexing the resilient element in accordance with the vibration and shock applied to the housing, and a piezoelectric element secured to the resilient element intermediate its ends for producing a voltage in accordance with the flexing of the resilient element.

References Cited in the file of this patent

UNITED STATES PATENTS

| | | |
|---|---|---|
| 2,045,404 | Nicholides | June 23, 1936 |
| 2,137,188 | Whitman | Nov. 15, 1938 |
| 2,302,670 | Buchanon | Nov. 24, 1942 |